US008558498B2

(12) United States Patent
 Takahashi et al.

(10) Patent No.: US 8,558,498 B2
(45) Date of Patent: Oct. 15, 2013

(54) DRIVE DEVICE

(75) Inventors: Hiroshi Takahashi, Yokohama (JP);
 Hideki Nukada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/457,655

(22) Filed: Apr. 27, 2012

(65) Prior Publication Data
 US 2012/0268055 A1 Oct. 25, 2012

Related U.S. Application Data

(63) Continuation of application No. PCT/JP2009/068825, filed on Nov. 4, 2009.

(51) Int. Cl.
 *G05B 11/01* (2006.01)
(52) U.S. Cl.
 USPC ........... 318/631; 318/560; 310/300; 310/311; 310/321; 310/323.01; 310/323.02
(58) Field of Classification Search
 USPC .................. 318/560, 631; 310/300, 311, 321, 310/323.01, 323.02
 See application file for complete search history.

(56) References Cited

U.S. PATENT DOCUMENTS

2006/0267450 A1* 11/2006 Matsuki ........................ 310/309
2012/0025669 A1* 2/2012 Takahashi ................ 310/323.02

FOREIGN PATENT DOCUMENTS

| JP | 61-246812 | | 11/1986 |
| JP | 63-136111 | | 6/1988 |
| JP | 63-299785 | | 12/1988 |
| JP | 04-207982 | | 7/1992 |
| JP | 05151580 | A * | 6/1993 |
| JP | 08-074869 | | 3/1996 |
| JP | 08-126354 | | 5/1996 |
| JP | 2002305896 | A * | 10/2002 |
| JP | 2005-256954 | | 9/2005 |
| JP | 2009145082 | A * | 7/2009 |

OTHER PUBLICATIONS

Machine translation of JP 05151580 A.*
Machine translation of JP 2002305896 A.*
International Preliminary Report for International Application No. PCT/JP2009/068825 issued Jun. 12, 2012.
International Search Report for International Application No. PCT/JP2009/068825 mailed on Feb. 2, 2010.
Ikuta, et al; "Hyper Redundant Active Endoscope for Minimally Invasive Surgery"; Journal of the Robotics Society of Japan, vol. 16, No. 4, 1998, pp. 145-151.

* cited by examiner

*Primary Examiner* — Kawing Chan
(74) *Attorney, Agent, or Firm* — Turocy & Watson, LLP

(57) ABSTRACT

According to one embodiment, a drive device comprises a first generating unit which moves in straightly movable manner or rotatable manner and generates precharge pressure, a sliding guide unit which has a sliding guide surface that comes into contact with a sliding surface of the first generating unit and to which the precharge pressure is given, a vibration unit which gives vibration to the first generating unit, and a second generating unit. When the vibration is given to the first generating unit, the second generating unit generates driving force for driving the first generating unit in a predetermined direction so that the driving force is more than frictional force between the sliding surface and the sliding guide surface. When the vibration is not given to the first generating unit, the second generating unit generates the driving force so that the driving force is less than the frictional force.

4 Claims, 10 Drawing Sheets

– 1 –
DRIVE DEVICE

CROSS REFERENCE TO RELATED APPLICATIONS

This application is a continuation application of International Application No. PCT/JP2009/068825, filed on Nov. 4, 2009, the entire contents of which are incorporated herein by reference.

FIELD

Embodiments described herein relate generally to a drive device.

BACKGROUND

Known micromovement devices for achieving precise positioning include a device for carrying out parallel movement or posture control by giving an impact force larger than a frictional force to a mass to be moved which is under the effect of the frictional force (for example, see Japanese Patent Application Laid-Open No. S60-60582) and a device for moving a mobile body by giving an impact force to the mobile body using a piezoelectric and electrostrictive element (for example, see Japanese Patent Application Laid-Open No. S63-299785).

In the former case, electromagnetic repulsive force is used as means for generating an impact force, and the latter case is a micromovement device using rapid deformation of the piezoelectric element, and they are referred to as so called "impact mechanism". This impact mechanism has a small and simple structure, and capable of moving in micro-steps. For example, the impact mechanism is used for a precise positioning table, a micro manipulator, and the like.

However, the above conventional micromovement device moves in micro-steps, and therefore, fast movement is difficult with the above conventional micromovement device.

It is known that frictional force between a rolling body and an orbital plane decreases when high-frequency micro-vibration is given (for example, see "Friction reduction effect using ultrasonic vibration and application thereof", Journal of The Japan Society of Mechanical Engineers, 1997, Vol. 100, No. 946, and Ikuta et al., "Hyper Redundant Active Endoscope for Minimally Invasive Surgery", Journal of The Robotics Society of Japan, 1998, Vol. 16, No. 4), and a bearing mechanism has been suggested that uses this phenomenon to reduce torque during bearing driving and prevent stick slip vibration (for example, see Japanese Patent Application Laid-Open No. H8-74869 and Japanese Patent Application Laid-Open No. 2005-256954). This kind of bearing mechanism exhibits superior performance in terms of precise positioning with friction reduction effect and exhibits superior performance in terms of setting and stability with friction sliding effect.

However, with the above conventional bearing mechanism, fast movement is difficult due to the friction sliding effect.

DETAILED DESCRIPTION

According to one embodiment, a drive device comprises a first generating unit which moves in straightly movable manner or rotatable manner and generates precharge pressure, a sliding guide unit which has a sliding guide surface that comes into contact with a sliding surface of the first generating unit and to which the precharge pressure is given, a vibration unit which gives vibration to the first generating unit, and a second generating unit. When the vibration is given to the first generating unit, the second generating unit generates driving force for driving the first generating unit in a predetermined direction so that the driving force is more than frictional force between the sliding surface and the sliding guide surface. When the vibration is not given to the first generating unit, the second generating unit generates the driving force so that the driving force is less than the frictional force.

Embodiments of the present invention will be hereinafter explained with reference to drawings.

Figure 1:
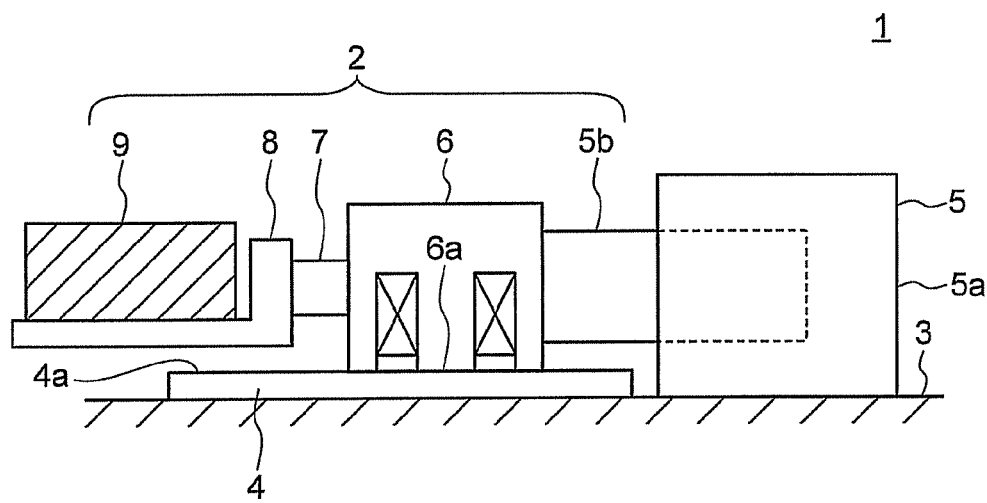
FIG. 1 is a cross sectional view illustrating a drive device according to a first embodiment.

(First embodiment) FIG. 1 illustrates a cross section of a drive device 1 according to a first embodiment of the present invention. The drive device 1 includes a movable unit 2, a sliding plate 4, and a linear motor 5. The sliding plate 4 and the linear motor 5 are installed on a stationary base 3. The linear motor 5 includes a stator 5a, a movable body 5b, a permanent magnet, a control coil (not shown), and the like. The linear motor 5 will be explained later in detail.

The movable unit 2 includes the movable body 5b of the linear motor 5, the electromagnet 6, a piezoelectric element 7, a table 8, and a positioning target 9. The movable unit 2 can move in the right and left direction of the figure in a linearly movable manner. The movable body 5b is coupled with one end of the electromagnet 6, and one end of the piezoelectric element 7 is coupled with the other end thereof. The table 8 is provided at the other end of the piezoelectric element 7. The positioning target 9 is mounted on the table 8.

The movable unit 2 can be moved by thrust generated by the linear motor 5. A sliding surface (lower surface of the electromagnet 6) 6a of the movable unit 2 is in contact with a sliding guide surface 4a of the sliding plate 4, and slides thereon. The piezoelectric element 7 can extend and shrink in a direction substantially parallel to the sliding guide surface 4a.

As described above, the movable unit 2 is configured such that the movable body 5b of the linear motor 5, the electromagnet 6, the piezoelectric element 7, and the table 8 are configured to be coupled in series along the sliding guide surface 4a.

Figure 2:
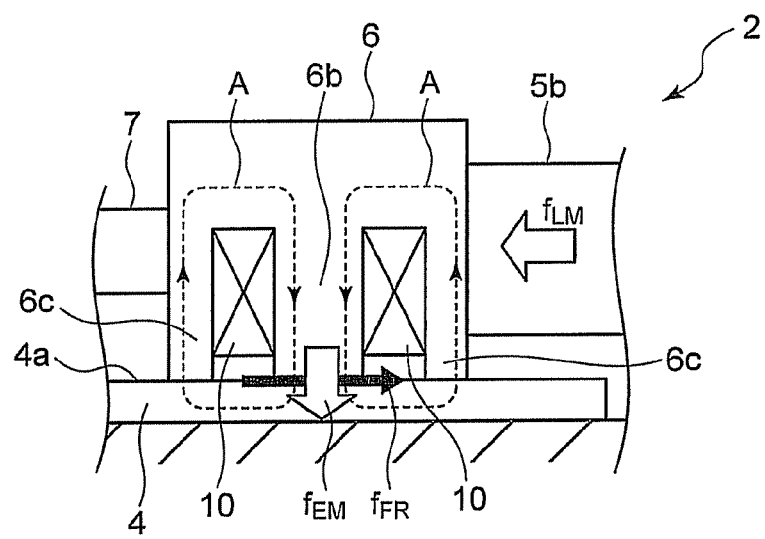
FIG. 2 is a cross sectional view illustrating an electromagnet.

FIG. 2 shows a cross section of the electromagnet 6. The electromagnet 6 is a cylindrical-shaped electromagnet having a control coil 10. When an electric current is applied by an electromagnet driver (not shown) to the control coil 10, a magnetic path A is generated in the electromagnet 6. The magnetic path A constitutes a closed loop which passes through a central yoke 6b of the electromagnet 6, a sliding plate 4, and an external peripheral yoke 6c of the electromagnet 6.

Accordingly, attracting force is generated on a surface of the central yoke 6b and the external peripheral yoke 6c that faces the sliding plate 4 (which is a pole face, and in this case, this is a sliding surface 6a), whereby a precharge pressure $f_{EM}$ can be given between the electromagnet 6 and the sliding plate 4. The precharge pressure $f_{EM}$ can be adjusted by changing the exciting current given to the control coil 10.

FIG. 2 shows the magnetic path A which is divided into two portions, but this figure is a cross sectional view, and in reality, the magnetic path A is distributed continuously in a peripheral direction about the central yoke 6b of the electromagnet 6. Likewise, FIG. 2 shows the control coil 10 which is divided into two portions, but the control coil 10 forms one coil body wrapped around the central yoke 6b.

The direction of the magnetic path A is not limited to what is shown in FIG. 2. By changing the exciting current applied to the control coil 10, the direction of the magnetic path A may be in a direction opposite to the direction shown in FIG. 2.

In this case, when the linear motor 5 is activated, and the thrust (driving force) $f_{LM}$ is applied to the movable unit 2, a frictional force $f_{FR}$ dependent upon the precharge pressure $f_{EM}$ is generated between the sliding surface 6a and the sliding guide surface 4a, and this serves as a braking force against the thrust $f_{LM}$. If the frictional force $f_{FR}$ is less than the thrust $f_{LM}$, the movable unit 2 slides along the sliding guide surface 4a toward the left in the figure. When the frictional force $f_{FR}$ is more than the thrust $f_{LM}$, the movable unit 2 maintains a stopped state. The frictional force $f_{FR}$ can be adjusted by changing the precharge pressure $f_{EM}$.

Figure 3:
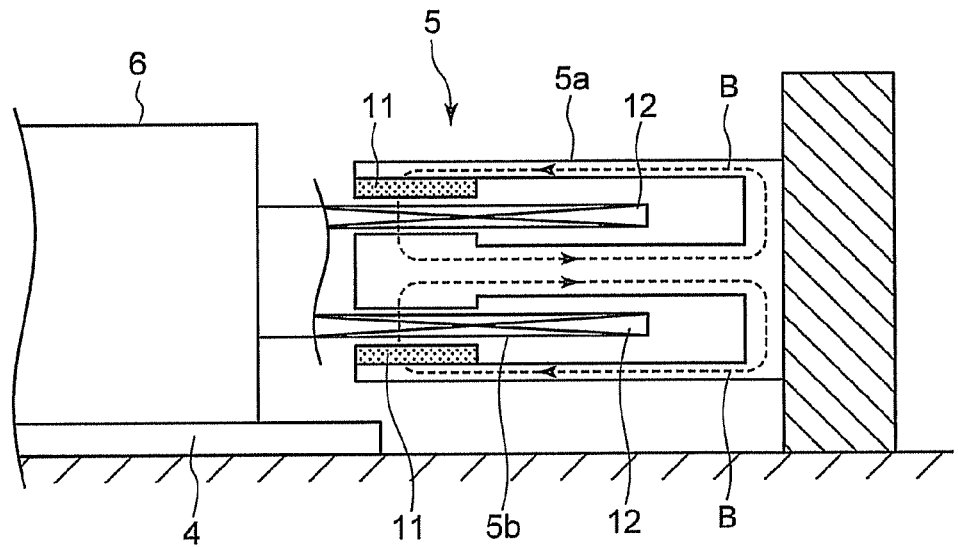
FIG. 3 is a cross sectional view illustrating a linear motor.

FIG. 3 shows a cross section of the linear motor 5. The linear motor 5 is a voice coil motor (VCM) including the stator 5a in which a magnetic path B is formed by a permanent magnet 11 in a circular body and the movable body 5b having the control coil 12. When an electric current is applied to the control coil 12 by a VCM driver, not shown, the thrust $f_{LM}$ is generated according to Fleming's left-hand rule.

Although FIG. 3 shows the configuration of the voice coil motor, but the method of the linear motor 5 is not limited thereto. Other methods may also be used as the configuration of the linear motor.

Subsequently, operation of the drive device 1 according to the present embodiment will be explained. When an electric current is applied to the control coil 12 of the linear motor 5, the thrust $f_{LM}$ is generated, and when an electric current is applied to the control coil 10 of the electromagnet 6, the precharge pressure $f_{EM}$ is generated. At this occasion, the electric current applied to the control coil 10 and the control coil 12 is adjusted so that the frictional force $f_{FR}$ (more specifically, the $f_{FR\_OFF}$ explained later) is more than the thrust $f_{LM}$. Therefore, the movable unit 2 is still stopped.

A high-frequency instruction signal is input to a piezoelectric amplifier, not shown, electrically connected with the piezoelectric element 7. Accordingly, a high-frequency vibrating force is given to the electromagnet 6 while relying on the inertial force of the table 8 on which the positioning target 9 is mounted. When this high-frequency vibrating force is more than the frictional force $f_{FR}$ (more specifically, the $f_{FR\_OFF}$ explained later), micro-vibration displacement occurs on the sliding surface 6a. It is known that when the high-frequency micro-vibration occurs on the sliding surface 6a, the frictional force with the sliding guide surface 4a changes and the frictional force $f_{FR\_ON}$ obtained when the high-frequency micro-vibration is applied is more than the frictional force $f_{FR\_OFF}$ obtained when the high-frequency micro-vibration is not applied ($f_{FR\_ON} < f_{FR\_OFF}$).

Accordingly, when the applied electric current and the like are adjusted so that the frictional force $f_{FR\_OFF}$ is more than the thrust $f_{LM}$ and the frictional force $f_{FR\_ON}$ is less than the thrust $f_{LM}$, the movable unit 2 is as follows. Under the condition of the frictional force $f_{FR\_OFF}$, the movable unit 2 can be maintained in the stationary state. Under the condition of the frictional force $f_{FR\_ON}$, the movable unit 2 can be made in a state in which the movable unit 2 can slide along the sliding guide surface 4a. Therefore, each operation of moving and stopping of the movable unit 2 can be controlled by manipulating the high-frequency instruction signal that is input to the piezoelectric amplifier driving the piezoelectric element 7.

Figure 4:
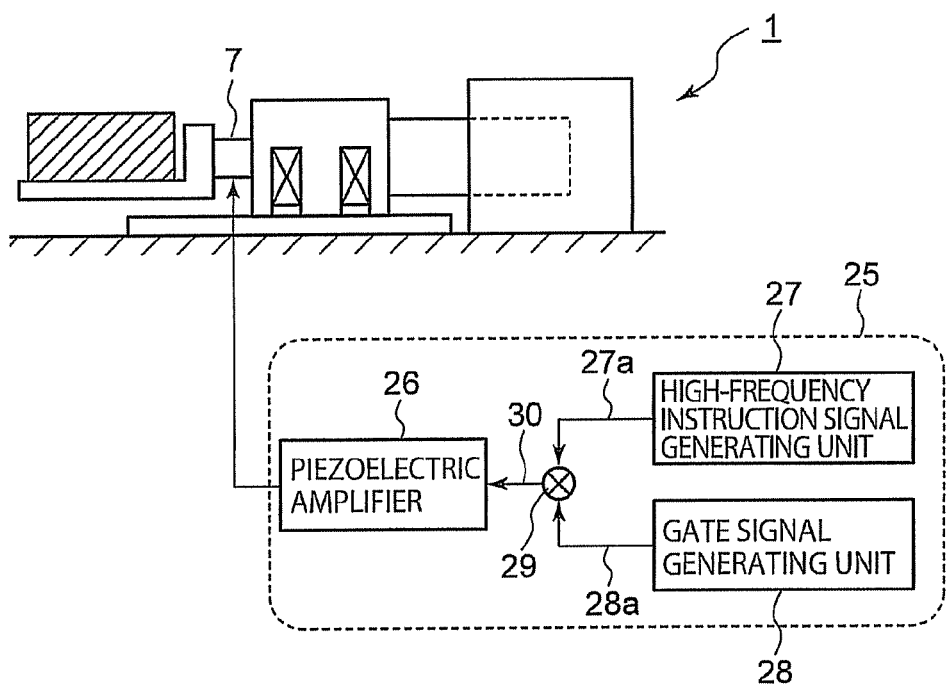
FIG. 4 is a schematic configuration diagram illustrating a micro-vibration control driver.

For example, the high-frequency instruction signal can be manipulated by switching, between ON/OFF, the state of the high-frequency instruction signal that is input to the piezoelectric amplifier 26 driving the piezoelectric element 7 using a micro-vibration control driver 25 as shown in FIG. 4.

As shown in FIG. 4, the micro-vibration control driver 25 includes the piezoelectric amplifier 26, a high-frequency instruction signal generating unit 27, a gate signal generating unit 28 determining an interval time of intermittent driving, and a multiplying device 29. The high-frequency instruction signal generating unit 27 sets the type of waveform, a frequency, an amplitude, and an offset value in accordance with a predetermined setting method, and outputs an output signal 27a. Any one of a sine wave, a square wave, a triangle wave, a sawtooth wave, and any waveform given by a user is selected as the type of waveform.

The frequency and the amplitude are determined in view of the specification of the piezoelectric element 7, mechanical properties of the device 1, and the specification of the piezoelectric amplifier 26, but it is desirable to set the frequency within an ultrasonic range from the view point of occurrence of abnormal noises. When the piezoelectric element 7 is a laminated type, the offset value is set as necessary, and an application voltage signal of only a plus voltage is generated.

The gate signal generating unit 28 sets the frequency and a duty ratio based on the interval time of the intermittent driving in accordance with a predetermined setting method, and outputs an output signal 28a based on a square wave signal of which amplitude is a reference value 1.

The output signals 27a, 28a are input to the multiplying device 29, and the multiplying device 29 outputs a piezoelectric element instruction signal 30 to the piezoelectric amplifier. The piezoelectric amplifier 26 drives the piezoelectric element 7 on the basis of the piezoelectric element instruction signal 30. As a result, micro-vibration is obtained from the above actions.

Figure 5A:
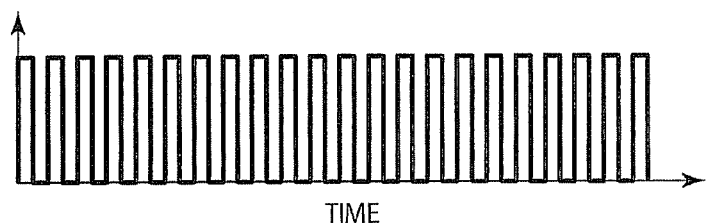
FIGS. 5A to 5E are figures illustrating an example of time history of each signal, frictional force, and a moving distance of a movable unit.
Figure 5B:
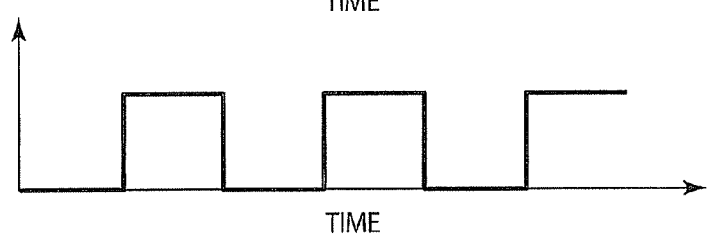
Figure 5C:
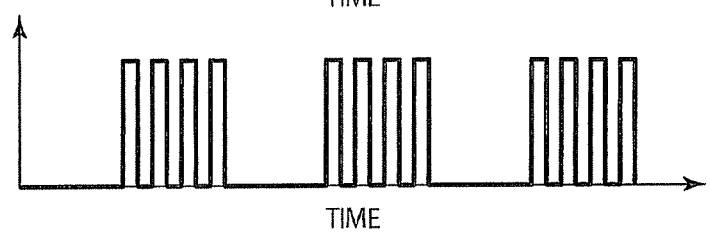
Figure 5D:
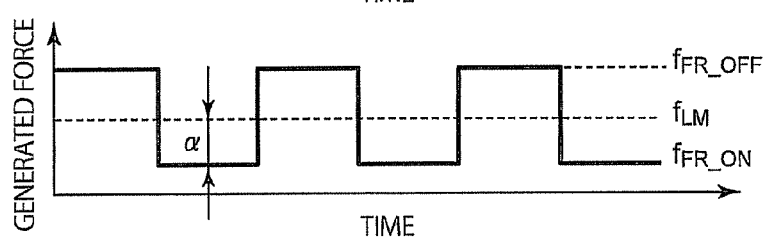
Figure 5E:
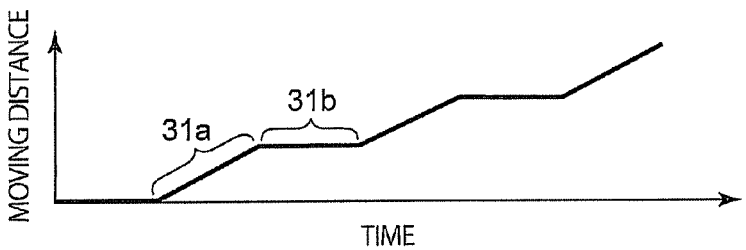

FIGS. 5A to 5E show an example of time history of each signal, the frictional force and the thrust $f_{LM}$ between the sliding surface 6a and the sliding guide surface 4a, and the moving distance of the movable unit 2. FIG. 5A shows an output signal 27a of the high-frequency instruction signal generating unit 27. FIG. 5B shows an output signal 28a of the gate signal generating unit 28. FIG. 5C shows a piezoelectric element instruction signal 30. A solid line in FIG. 5D denotes the frictional force, and a broken line therein denotes the thrust $f_{LM}$. FIG. 5E denotes the moving distance.

In the present embodiment, as shown in the figure, using the piezoelectric element instruction signal 30 obtained by switching, between ON and OFF, the state of the high-frequency instruction signal 27a of the micro-vibration control driver 25, the movable unit 2 is caused to be in a moving state 31a when a high-frequency vibration is given to make the frictional force less than the thrust ($f_{FR\_ON} < f_{LM}$), and the movable unit 2 is caused to be in a stopped state 31b when the high-frequency vibration is not given to make the frictional force more than the thrust ($f_{LM} < f_{FR\_OFF}$).

Since the piezoelectric element 7 is driven using the micro-vibration control driver 25, the driving control-type drive device 1 can be achieved with a high speed responsiveness which is the feature of the piezoelectric element 7, and this can achieve high speed intermittent driving with a short intermittent cycle. In addition, since each operation of driving and stopping of the drive device 1 is achieved by changing the frictional force of the sliding surface 6a, the movable unit 2 can obtain a high degree of dumping effect caused by friction without any control in a passive manner, and this can improve the setting during stopping operation and the stability during stop. As compared with a conventional configuration in which dumping is given by a control system, it is not necessary to have any sensor or control circuit, and therefore, the size of the device can be reduced. Therefore, even with a simple configuration, high-speed microscopic intermittent driving can be easily achieved in a closed loop control system.

As described above, according to the drive device of the present embodiment, the properties of the moving speed, the setting, the stability, and the positioning accuracy can be improved.

In the configuration using the sliding plate 4 of the drive device 1 as shown in FIG. 1, the movable unit 2 is freely movable within the plane of the sliding guide surface 4a. Therefore, for the purpose requiring precise positioning, a guide mechanism, not shown, may be needed separately in order to restrict the degree of flexibility in directions other than the driving direction.

Figure 6:
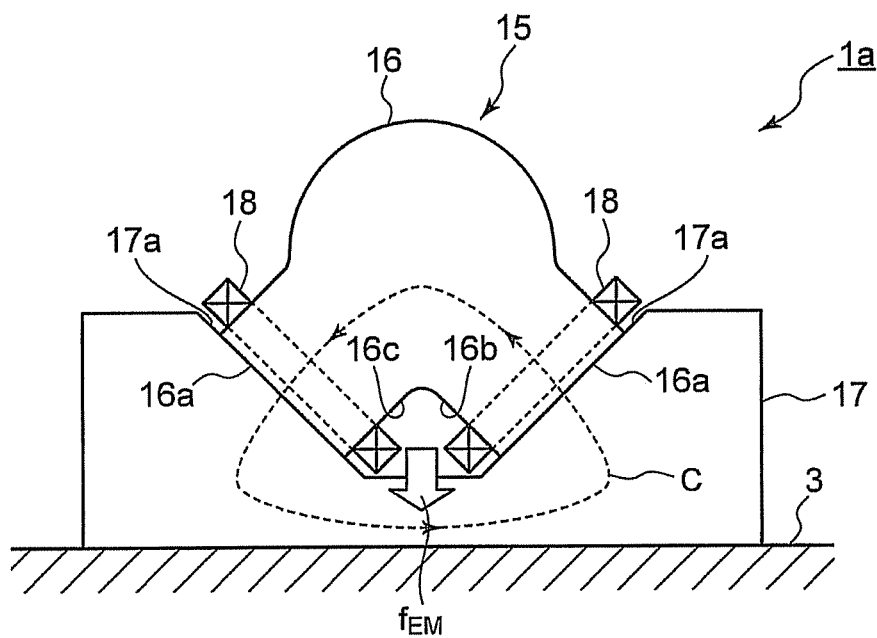
FIG. 6 is a cross sectional view illustrating a drive device according to a modification.

FIG. 6 shows a configuration of a drive device 1a capable of restricting the degree of flexibility in directions other than the driving direction without using any guide mechanism of an external device. FIG. 6 is a vertical cross-sectional view of the drive device 1a taken in a direction perpendicular to the driving direction. In this case, only portions different from the driving device 1 as shown in FIGS. 1 to 3 will be explained, and the explanation of the same portions will not be repeated.

The drive device 1a includes a movable unit 15 and a sliding plate 17, and is installed on a stationary base 3. This sliding plate 17 has a sliding guide surface 17a that comes into contact with and slides on a sliding surface 16a of an electromagnet 16 of the movable unit 15. The sliding surface 16a and the sliding guide surface 17a make a V-shaped form in a plane perpendicular to the driving direction of the movable unit 15.

The electromagnet 16 constitutes a horseshoe shape type electromagnet having a control coil 18, and when an electric current is applied to the control coil 18 by an electromagnet driver, not shown, a magnetic path C is generated in the electromagnet 16. This magnetic path C constitutes a closed loop which passes through one of magnetic poles 16b of the electromagnet 16, a sliding plate 17, and the other of magnetic poles 16c of the electromagnet 16.

Accordingly, attracting force is generated on a surface of the magnetic poles 16b, 16c that faces the sliding plate 17 (in this case, this is a sliding surface 16a), whereby a precharge pressure $f_{EM}$ can be given between the electromagnet 16 and the sliding plate 17 by a resultant force of the attracting force generated by the magnetic poles 16b, 16c. The precharge pressure $f_{EM}$ can be easily adjusted by changing the exciting current to the control coil 18.

When this kind of configuration is employed, the degree of flexibility in directions other than the driving direction can be restricted without using any guide mechanism of an external device. Therefore, by eliminating the guide mechanism of the external device, the size of the device can be further reduced, and the positioning characteristics can be improved.

In the above drive devices 1, 1a, the pole face of the electromagnet is the sliding surface. However, a magnetic pole material of the electromagnet (including a surface treatment material) and a material of the sliding surface (including the sliding plate and a surface treatment material thereof) may not be an ideal combination. In particular, for the purpose in which long life and precise positioning are strongly demanded, the degree of flexibility of the design may be insufficient, and it may be difficult to achieve satisfactory performance.

Figure 7:
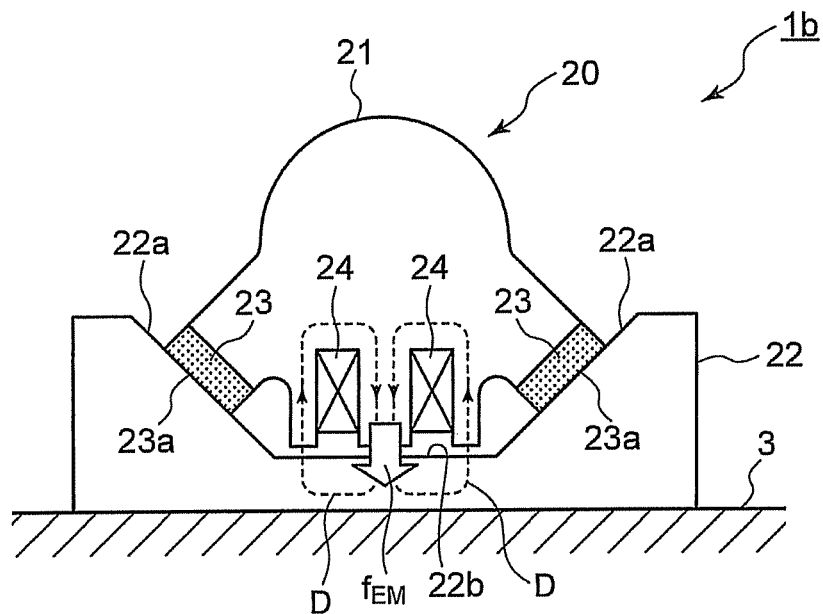
FIG. 7 is a cross sectional view illustrating a drive device according to a modification.

FIG. 7 shows a configuration of a drive device 1b in which a magnetic pole material of an electromagnet (including a surface treatment material) and a material of a sliding surface (sliding member 23) can be separately designed. FIG. 7 is a vertical cross-sectional view of the drive device 1b taken in a direction perpendicular to the driving direction. In this case, only portions different from the driving device 1 as shown in FIGS. 1 to 3 will be explained, and the same portions are omitted from the explanation.

The drive device 1b includes a movable unit 20 and a sliding plate 22, and is installed on a stationary base 3. This sliding plate 22 has a sliding guide surface 22a that comes into contact with and slides on a sliding surface 23a of the sliding member 23 of the movable unit 20. The sliding surface 23a and the sliding guide surface 22a make a V-shaped form in a plane perpendicular to the driving direction of the movable unit 20. The effects of the V-shaped form are the same as the effects explained in FIG. 6.

The electromagnet 21 is a cylindrical-shaped electromagnet having a control coil 24, and when an electric current is applied to the control coil 24 by an electromagnet driver, not shown, a magnetic path D is generated in the electromagnet 21. With this magnetic path D, due to the same effects as those of FIG. 2, attracting force is generated on a surface 22b of the sliding plate 22 that faces the magnetic pole of the electromagnet 21, whereby a precharge pressure $f_{EM}$ can be given between the electromagnet 21 and the sliding plate 22. The precharge pressure $f_{EM}$ can be easily adjusted by changing the exciting current to the control coil 24. A predetermined clearance is provided between the electromagnet 21 and the surface 22b of the sliding plate 22 that faces the magnetic pole of the electromagnet 21, and there occurs no mechanical sliding due to the driving.

In this kind of configuration, the sliding member 23 can be separately designed, and the degree of flexibility of the design can be enhanced, so that the device can be optimized.

Figure 8:
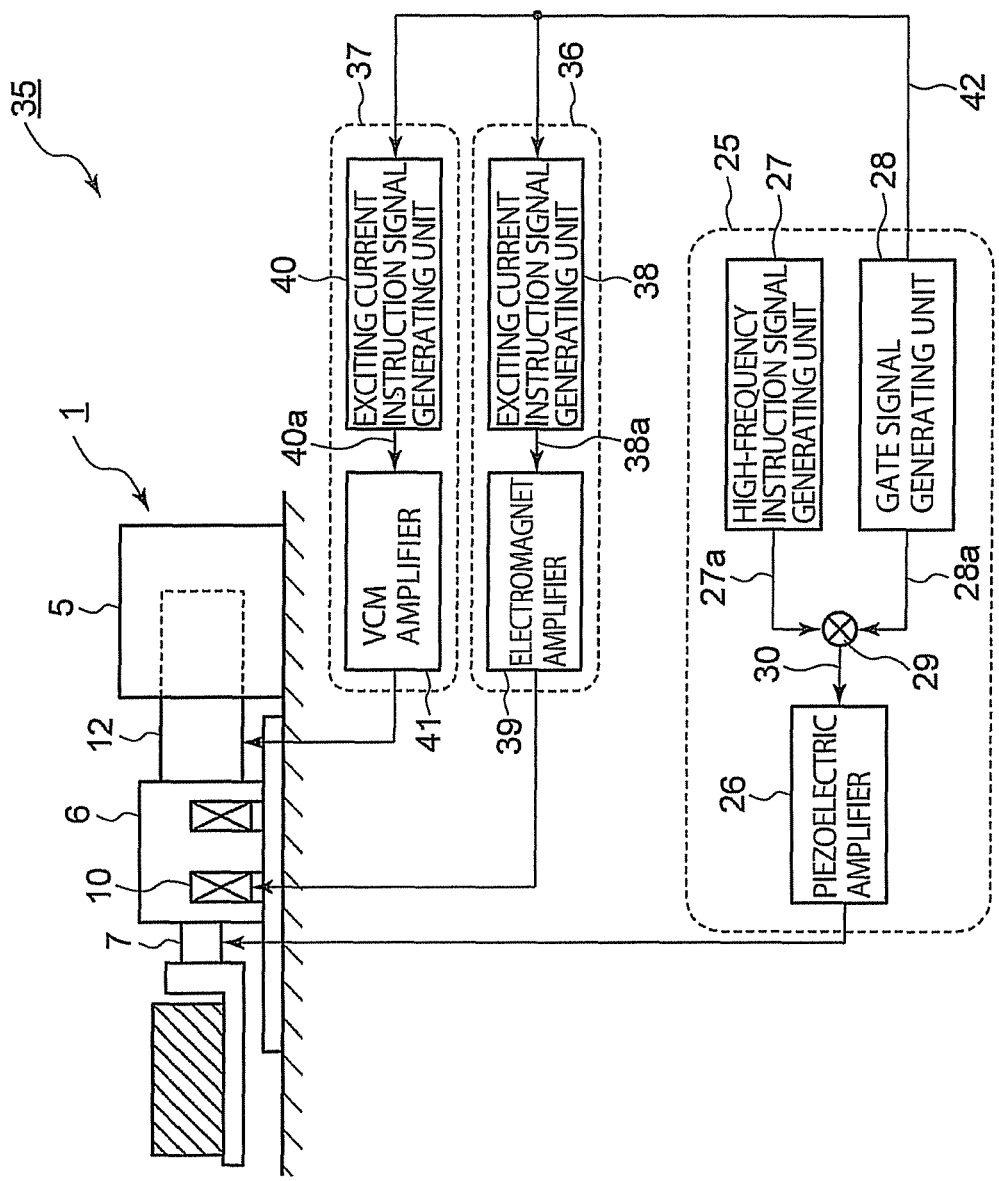
FIG. 8 is a schematic configuration diagram illustrating a driver system of a drive device according to a second embodiment.

(Second embodiment) FIG. 8 shows a schematic configuration of a driver system of a drive device 1 according to a second embodiment of the present invention. A driver system 35 according to the present embodiment has a configuration obtained by adding an electromagnet control driver 36 and a VCM control driver 37 to the micro-vibration control driver 25 according to the first embodiment as shown in FIG. 4. The drive device 1 is the same as the drive device 1 in the first embodiment as shown in FIG. 1.

The electromagnet control driver 36 applies an electric current to a control coil 10 of an electromagnet 6. The electromagnet control driver 36 has an exciting current instruction signal generating unit 38 and an electromagnet amplifier 39. An output signal 38*a* of the exciting current instruction signal generating unit 38 is input to the electromagnet amplifier 39, and the electromagnet amplifier 39 applies an electric current to the control coil 10 in proportion to the output signal 38*a*.

The VCM control driver 37 applies an electric current to the control coil 12 of the linear motor 5. The VCM control driver 37 includes an exciting current instruction signal generating unit 40 and a VCM amplifier 41. An output signal 40*a* of the exciting current instruction signal generating unit 40 is input to the VCM amplifier 41, and the VCM amplifier 41 applies an electric current to the control coil 12 in proportional to the output signal 40*a*.

The gate signal generating unit 28 outputs a synchronization signal 42 to the exciting current instruction signal generating units 38 and 40. The exciting current instruction signal generating units 38 and 40 can output output signals 38*a*, 40*a* on the basis of (in synchronization with) the synchronization signal 42. Accordingly, the attracting force $f_{EM}$ of the electromagnet 6 (the frictional force $f_{FR}$ that changes while relying on the attracting force $f_{EM}$) and the thrust $f_{LM}$ of the linear motor 5 can be controlled in accordance with each operation of moving and stopping of the movable unit 2 in the intermittent driving.

Figure 9A:
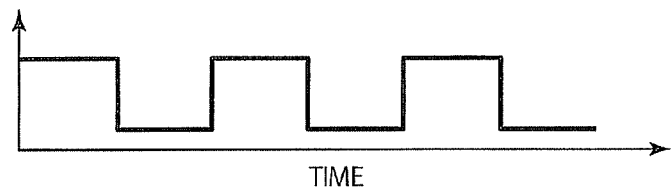
FIGS. 9A to 9G are figures illustrating an example of time history of each signal, frictional force, and a moving distance of a movable unit.
Figure 9B:
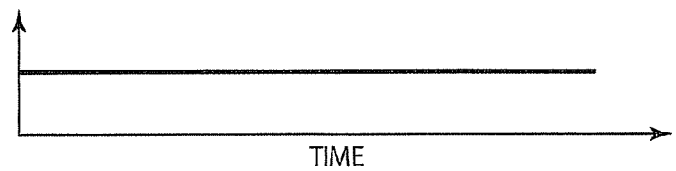
Figure 9C:
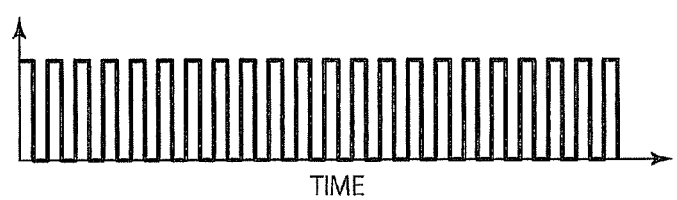
Figure 9D:
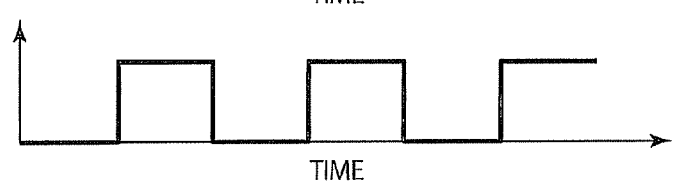
Figure 9E:
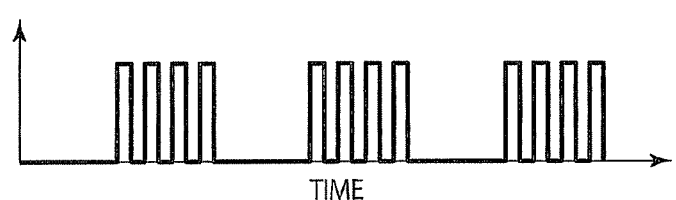
Figure 9F:
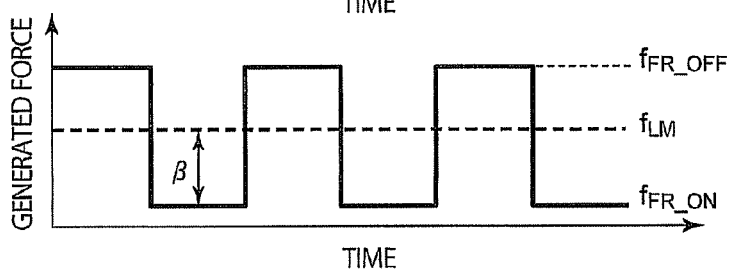
Figure 9G:
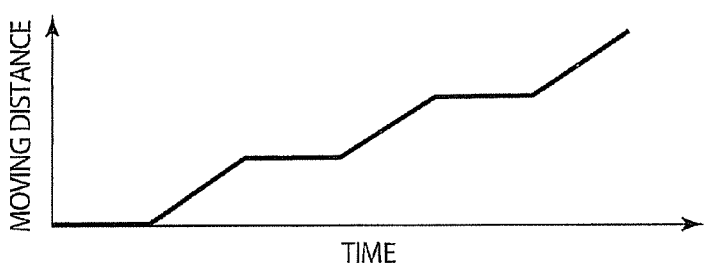
Figure 10A:
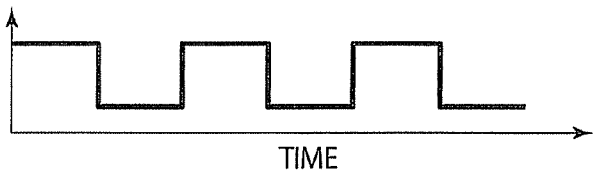
FIGS. 10A to 10G are figures illustrating an example of time history of each signal, frictional force, and a moving distance of a movable unit.
Figure 10B:
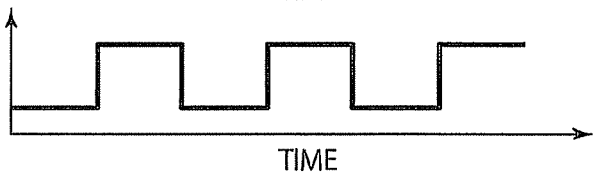
Figure 10C:
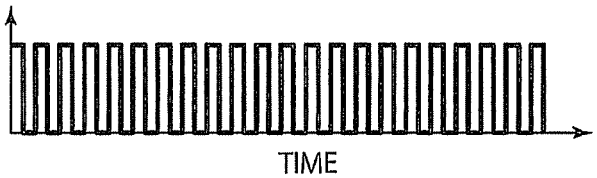
Figure 10D:
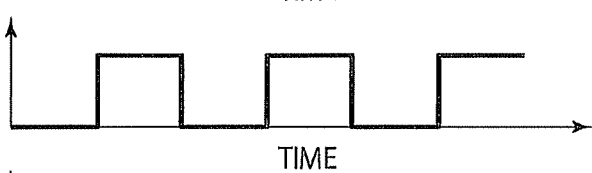
Figure 10E:
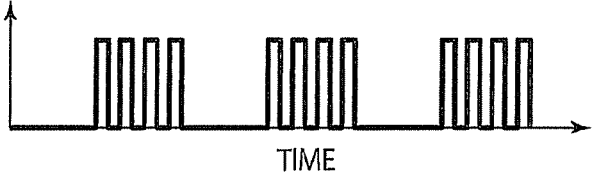
Figure 10F:
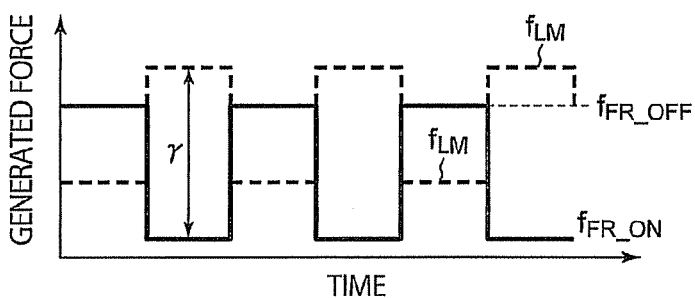
Figure 10G:
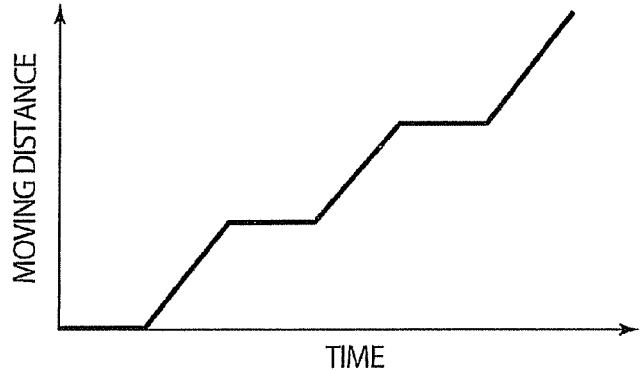

FIGS. 9A to 9G show an example of time history of various kinds of signals, the frictional force between the sliding surface 6*a* and the sliding guide surface 4*a*, and the thrust $f_{LM}$, and the moving distance of the movable unit 2, where the driver system 35 is used to drive the drive device 1. FIG. 9A shows an output signal 38*a* of the exciting current instruction signal generating unit 38. FIG. 9B shows an output signal 40*a* of the exciting current instruction signal generating unit 40. FIG. 9C shows an output signal 27*a* of the high-frequency instruction signal generating unit 27. FIG. 9D shows an output signal 28*a* of the gate signal generating unit 28. FIG. 9E shows a piezoelectric element instruction signal 30. A solid line in FIG. 9F denotes the frictional force, and a broken line therein denotes the thrust $f_{LM}$. FIG. 9G denotes the moving distance.

As shown in FIGS. 9A to 9G, the output signal 38*a* of the exciting current instruction signal generating unit 38 for the electromagnet 6 is changed in a square wave manner by achieving synchronization with the output signal 28*a* of the gate signal generating unit 28, so that the difference between a frictional force $f_{FR\_OFF}$ and a frictional force $f_{FR\_ON}$ of the sliding surface 6*a* can be increased to a level more than that of FIGS. 5A to 5E. As a result, the difference β between the thrust $f_{LM}$ of the linear motor 5 and the frictional force $f_{FR\_ON}$ can be increased to a level more than the difference α of FIGS. 5A to 5E. Therefore, the moving characteristics of the movable unit 2 are further improved.

In other words, the frictional force $f_{FR\_ON}$ is a braking force when the movable unit 2 is in the moving state, and therefore, α, β are actual thrusts of the movable unit 2. When these values are larger, a larger thrust can be provided to achieve high speed movement. In addition, since the frictional force $f_{FR\_OFF}$ of the sliding surface 6*a* can be increased to a level higher than that of FIGS. 5A to 5E. Therefore, the dumping effect due to friction can be further enhanced, and this can further improve the setting during stopping operation and the stability during stop.

FIGS. 10A to 10G show another example of time history of various kinds of signals, the frictional force between the sliding surface 6*a* and the sliding guide surface 4*a*, and the thrust $f_{LM}$, and the moving distance of the movable unit 2, where the driver system 35 is used to drive the drive device 1.

In this case, the output signal 40*a* of the exciting current instruction signal generating unit 40 for the linear motor 5 is changed in a square wave manner on the basis of the output signal 28*a* of the gate signal generating unit 28. Accordingly, a difference γ between the thrust $f_{LM}$ of the linear motor 5 and the frictional force $f_{FR\_ON}$ is further increased within a range in which the movable unit 2 is in the moving state, so that still faster movement can be achieved. This configuration is effective for movement with a relatively long stroke.

Figure 11:
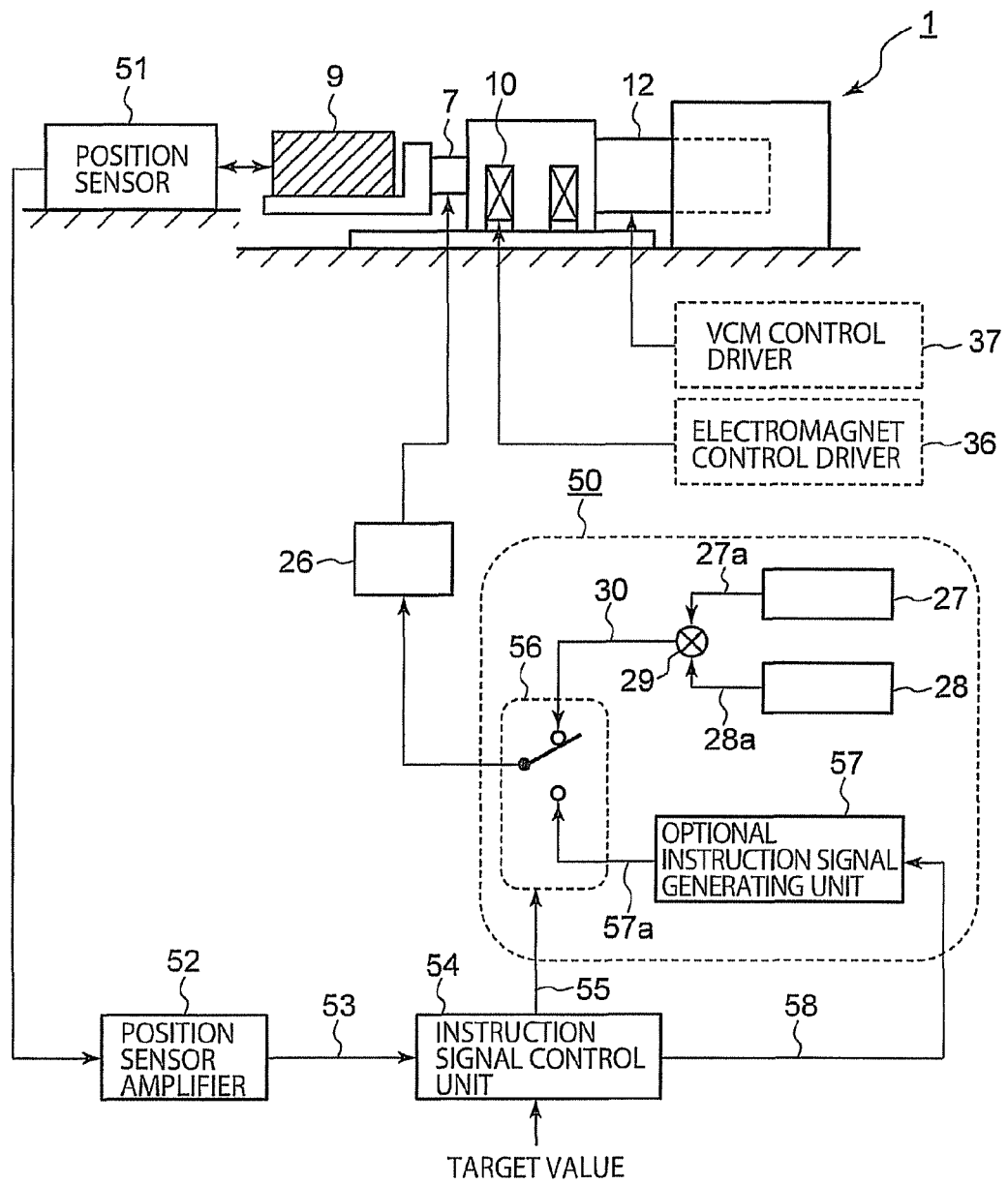
FIG. 11 is a schematic configuration diagram illustrating a driver system of a drive device according to a third embodiment.

(Third embodiment) FIG. 11 shows a schematic configuration of a drive device according to a third embodiment of the present invention. The drive device 1 according to the present embodiment has a configuration of a closed loop control system having a position sensor 51 for measuring operation displacement of the positioning target 9, a piezoelectric element control driver 50, and the like to control the position of a positioning target 9. The same constituent elements as those explained in the first, second embodiments are denoted with the same reference numerals, and description thereabout is omitted.

The position sensor 51 is, for example, a noncontact laser-type position sensor, and outputs position information 53 about a positioning target 9 via a position sensor amplifier 52. An instruction signal control unit 54 receives the position information 53, compares the position information 53 with a predetermined positioning target value, and outputs a switching signal 55 on the basis of the comparison result.

A signal switching unit 56 is configured to selectively switch a piezoelectric element instruction signal 30 and an output signal 57*a* of an optional instruction signal generating unit 57 on the basis of the switching signal 55.

When the result obtained by comparing the position information 53 and the positioning target value is outside of an error range set in advance, the signal switching unit 56 inputs the piezoelectric element instruction signal 30 to the piezoelectric amplifier 26. In this case, as described above, the entire movable unit 2 is moved using a change of the frictional force when the piezoelectric element 7 gives the high-frequency micro-vibration to the electromagnet 6. This is defined as a first driving mode.

On the other hand, when the result obtained by comparing the position information 53 and the positioning target value is within the error range set in advance, the signal switching unit 56 inputs the output signal 57*a* of the optional instruction signal generating unit 57 to the piezoelectric amplifier 26. At this occasion, the optional instruction signal generating unit 57 processes, with a predetermined control rule, a differential signal (position error differential signal) 58 between the position information 53 output from the instruction signal control unit 54 and the positioning target value, and outputs the output signal 57*a*. The control rule may be a publicly known one. For example, it is a PID control rule.

In this case, the movable unit 2 is stopped as a whole, and control is performed so that a position error differential signal 58 attains zero by adjusting the amount of extending/shrinking displacement of the piezoelectric element 7. Therefore, the error range set in advance for the position information 53 and the positioning target value is desirably equal to or less than a range in which the piezoelectric element 7 can extend and shrink to make displacement. This is defined as a second driving mode.

As described above, two types of driving modes can be provided. The two types of driving modes include the first driving mode for controlling the frictional force by causing the micro-vibration in the piezoelectric element and the second driving mode for controlling extending/shrinking displacement of the piezoelectric element on the basis of the position error differential signal 58. When "rough movement" is made in the first driving mode, and "fine movement" is made in the second driving mode, a precise positioning system can be achieved with two stages of servos for rough and fine movements.

According to the configuration of the present application, the rough movement function and the fine movement function are achieved by switching the driving mode, and therefore, as compared with a conventional rough and fine movement two-stage servo mechanism in a series-stacked type, the size of the device can be reduced, and the driving characteristics can be improved. In particular, the driving speed can be improved.

FIGS. 4, 8, and 11 show the configuration using the multiplying device 29 in order to obtain the piezoelectric element instruction signal 30. However, means for generating the piezoelectric element instruction signal 30 is not limited thereto. Alternatively, for example, DSP may be used to generate the piezoelectric element instruction signal 30 with a program.

FIG. 11 shows the configuration using the signal switching unit 56 as means for selectively switching the piezoelectric element instruction signal 30 and the output signal 57a of the optional instruction signal generating unit 57. However, the selective switching means of the two signals is not limited thereto. For example, a configuration may be employed with a processing unit for making one of the signals zero by using an adding device.

Figure 12:
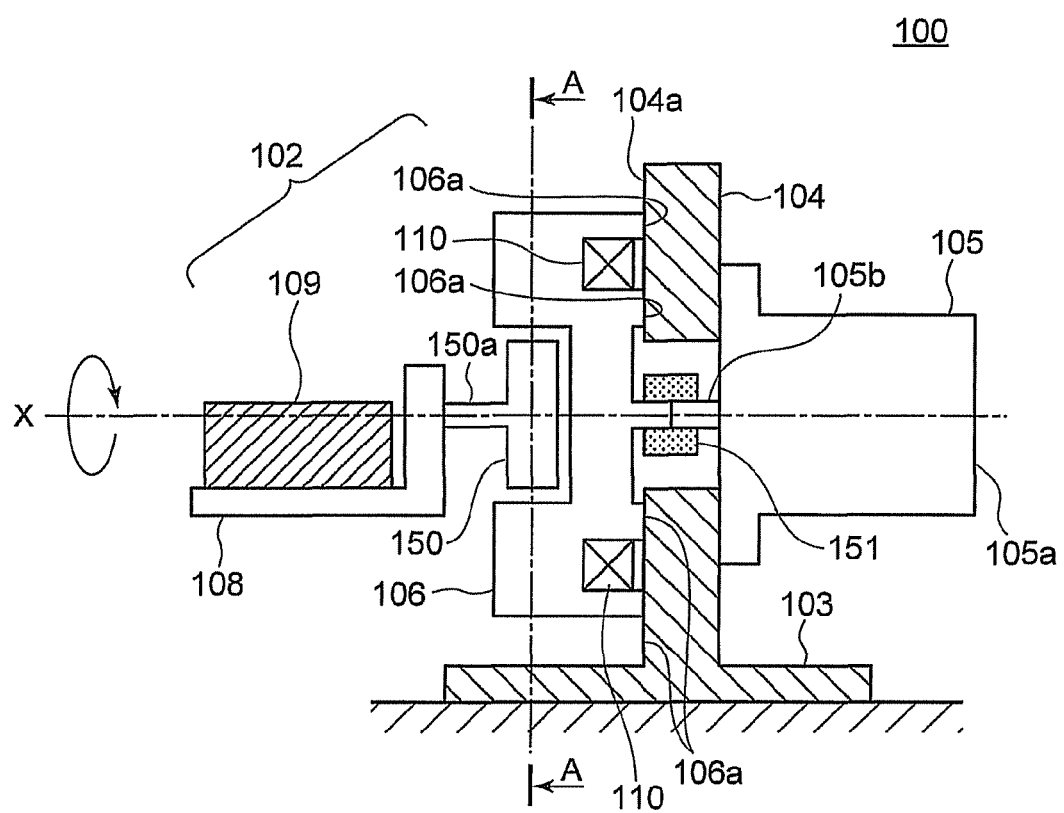
FIG. 12 is a cross sectional view illustrating a drive device according to a fourth embodiment.
Figure 13:
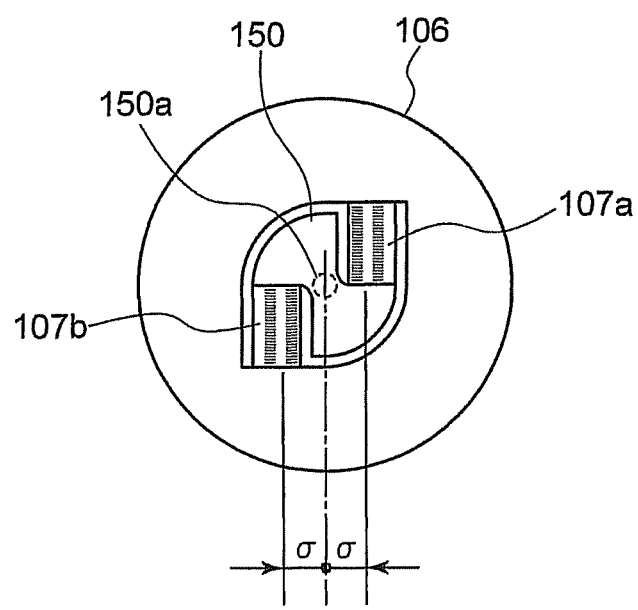
FIG. 13 is a cross sectional view illustrating a drive device according to the fourth embodiment.

(Fourth embodiment) FIG. 12 illustrates a cross section of a drive device 100 according to a fourth embodiment of the present invention. FIG. 13 is a cross sectional view of FIG. 12 taken along line A-A. The drive device 100 includes a movable unit 102, a sliding member 104, and a rotation motor 105.

The movable unit 102 can move about x axis in a rotatable manner. The movable unit 102 includes an electromagnet 106 having a sliding surface 106a and a rotation shaft 105b of the rotation motor 105 residing at one end of the electromagnet 106 and coupled with a shaft connector 151 on the x axis. In proximity to the other end portion of the electromagnet 106, piezoelectric elements 107a, 107b are provided, at two portions within a plane perpendicular to the x axis, in an axial symmetrical manner with a predetermined amount of parallel offset δ from the x axis.

The sliding member 104 is installed on a stationary base 103, and has a sliding guide surface 104a. The sliding guide surface 104a is in contact with the sliding surface 106a of the movable unit 102, and slides thereon.

The rotation motor 105 generates torque for allowing the movable unit 102 to move along the sliding guide surface 104a.

A piezoelectric element base 150 coupled with the other ends of the piezoelectric elements 107a, 107b and having a driving shaft 150a on the x axis is provided. A table 108 coupled with the driving shaft 150a of the piezoelectric element base 150 and having a positioning target 109 thereon is provided.

The electromagnet 106 constitutes a cylindrical-shaped electromagnet having a control coil 110. When an electric current is applied to the control coil 110 by an electromagnet driver, not shown, attracting force is generated in the electromagnet 10 between the electromagnet 10 and the sliding member 104, so that precharge pressure can be given between the electromagnet 106 and the sliding plate 104. The precharge pressure can be easily adjusted by changing the exciting current to the control coil 110.

Although the operation of the drive device 100 is different in terms of straight movement and rotating movement, the operation of the drive device 100 is the same as the above drive device 1 from the functional perspective, and detailed description thereabout is omitted.

The drive device 100 is configured to give the precharge pressure using the electromagnet 106, but the drive device 100 may be configured in any way as long as it is a pressure giving mechanism having a function of adjusting the frictional force by actively changing the precharge pressure. For example, the drive device 100 may be configured to use a permanent magnet, may be configured to use both of a permanent magnet and an electromagnet, may be configured to use an electrostatic absorption mechanism using electrostatic force, or may be configured to have an air absorption mechanism using absorption force with air pressure reduction.

In the above embodiments, the piezoelectric element is used as the means for generating micro-vibration for changing the frictional force. However, the embodiments are not limited thereto. For example, a magnetostrictor and the like may be used.

The drive device according to the present embodiment may be industrially applicable to fields in which a fast-speed highly-accurate positioning device is required, e.g., a measurement device, a processing device, an information device, and other wide range of fields.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A drive device comprising:
   a first generating unit which moves in straightly movable manner or rotatable manner and generates precharge pressure;
   a sliding guide unit which has a sliding guide surface that comes into contact with a sliding surface of the first generating unit and to which the precharge pressure is given;
   a vibration unit which is coupled with the first generating unit and which gives vibration to the first generating unit;
   a second generating unit;
   a position sensor; and
   a control driver,
   wherein when the vibration is given to the first generating unit, the second generating unit generates driving force for driving the first generating unit in a predetermined direction so that the driving force is more than frictional force between the sliding surface and the sliding guide surface, and when the vibration is not given to the first generating unit, the second generating unit generates the driving force so that the driving force is less than the frictional force, the vibration unit includes a positioning target unit and a piezoelectric element one end of which is coupled with the positioning target unit and the other end of which is coupled with the first generating unit, the piezoelectric element gives the vibration to the first generating unit, the position sensor detects a position of the positioning target unit, and when a difference between the position and a target value is more than a predetermined value, the control driver controls the piezoelectric element to give the vibration to the first generating unit, and when the difference is equal to or less than the predetermined value, the control driver stops the vibration and adjusts an amount of extending/shrinking displacement of the piezoelectric element so as to reduce the difference.

2. The drive device according to claim 1, wherein when the vibration is not given, the first generating unit generates first precharge pressure, and when the vibration is given, the first generating unit generates second precharge pressure that is less than the first precharge pressure.

3. The drive device according to claim 2, wherein when the vibration is not given to the first generating unit, the second generating unit generates first driving force, and when the vibration is given to the first generating unit, the second generating unit generates second driving force that is more than the first driving force.

4. The drive device according to claim 1, wherein the first generating unit generates the precharge pressure using absorption force made by magnetic force, electrostatic force, or air pressure reduction.

* * * * *